Jan. 12, 1932.  B. F. WADDELL  1,840,799
OPTICAL DEVICE
Filed Sept. 16, 1924    2 Sheets-Sheet 1
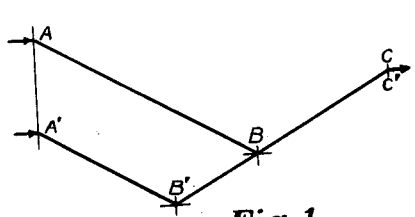
Fig. 1
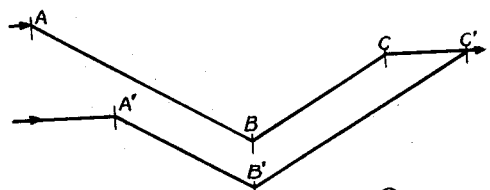
Fig. 2
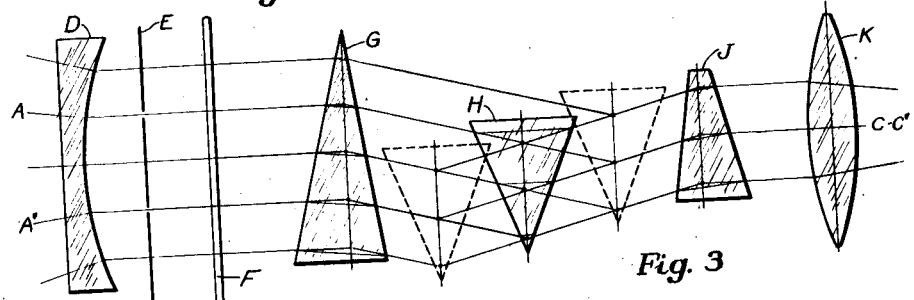
Fig. 3
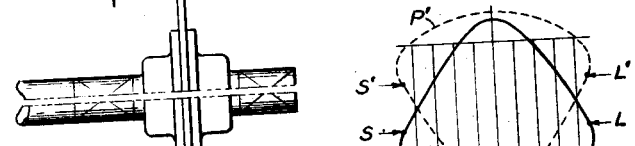
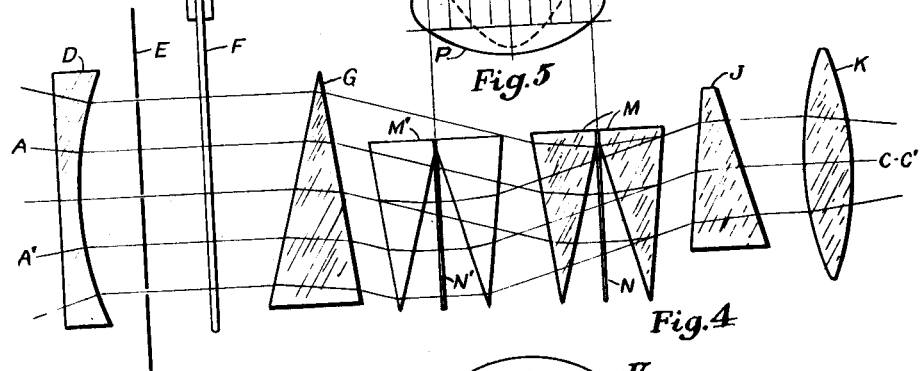
Fig. 5
Fig. 4
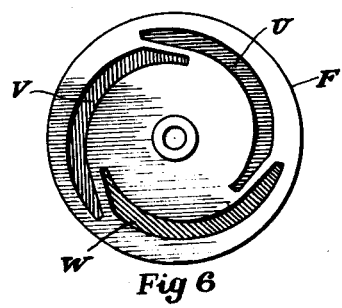
Fig 6
INVENTOR
Benson F. Waddell
BY
Dyer & Taylor
ATTORNEYS.

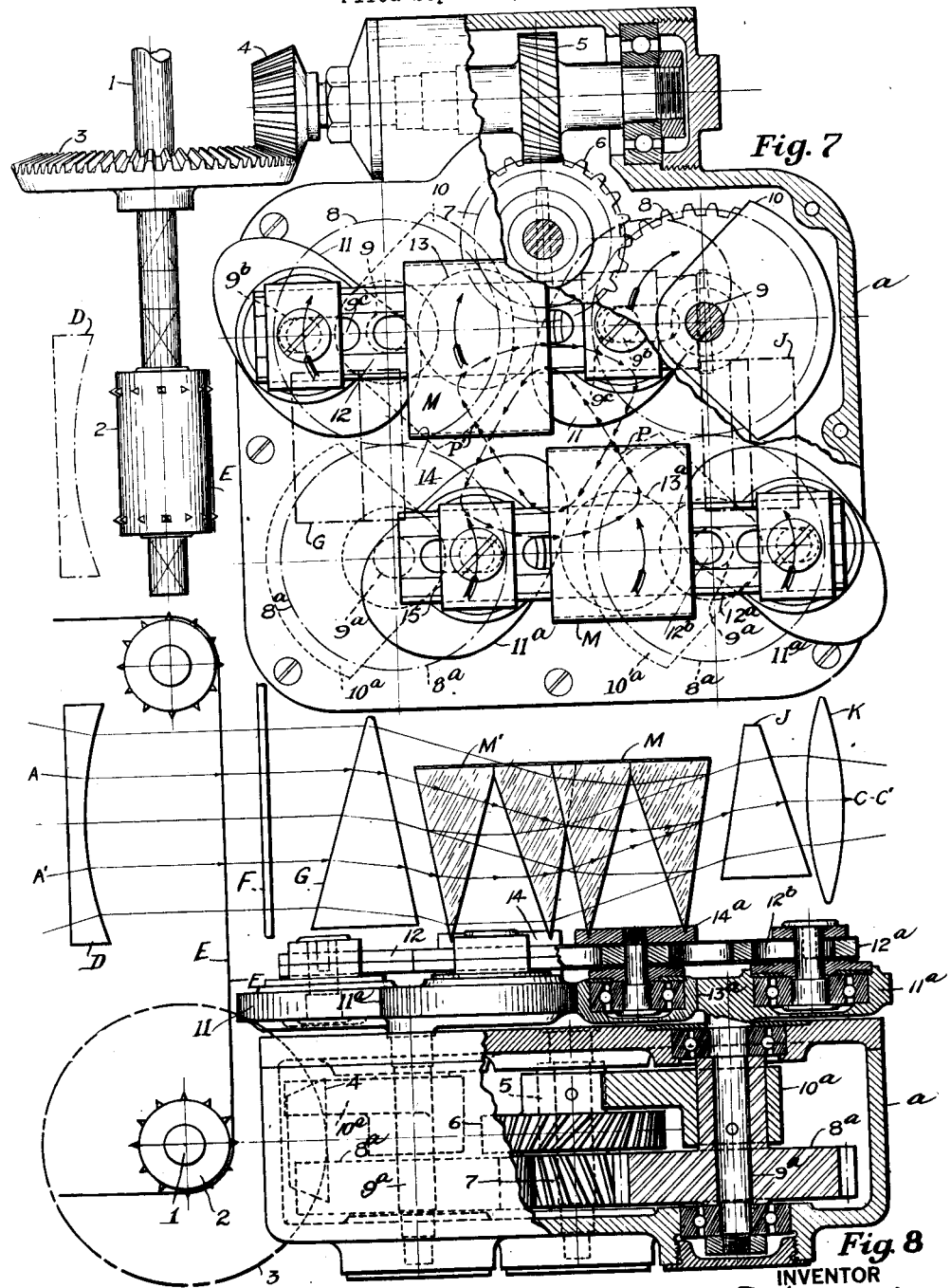

Patented Jan. 12, 1932

1,840,799

UNITED STATES PATENT OFFICE

BENSON F. WADDELL, OF ELMHURST, NEW YORK

OPTICAL DEVICE

Application filed September 16, 1924. Serial No. 737,960.

The invention is an optical device of general application for transforming a stationary light beam into a moving light beam or, conversely, the transformation of a light beam moving transversely to its axis into a stationary light beam, such a device being useful, for instance, in television, the taking and projecting of moving pictures and the like.

The prime object of the invention is to provide means whereby a projected ray of light may be satisfactorily projected without aberration on a screen or object, said ray of light either moving transversely to its axis, as in moving pictures, or being delivered from a relatively stationary point to a moving screen or object having a substantially uniform or non-intermittent motion.

This object is accomplished by deflecting the beam of light away from its original path or plane at a point and then deflecting it back into a path parallel to and approximately concentric with the original path or plane, while varying the ratio of the lengths of the deflected portions of the beam in synchronism with the continuous motion of the beam or the object on which it is projected, as the case may be.

While the principle of the invention is broadly disclosed herein, it is specifically shown and described in connection with a motion picture apparatus. Therefore, it is understood that the scope of the invention is only limited by the spirit and principle of the invention as expressed in the claims hereto appended.

These and further objects will more fully appear in the following specification and accompanying drawings considered together or separately.

One embodiment of the invention is illustrated in the accompanying drawings, in which like parts in all of the several figures are designated by corresponding characters of reference, and in which Fig. 1 is a diagram illustrating the manner in which a light ray may be deflected while the required ratio of lengths is obtained.

Fig. 2 is a similar view in which the ray may be deflected by another method of deflecting.

Fig. 3 is a diagram showing the carrying out of the invention by means of a simple prism as the central deflecting medium.

Fig. 4 is a similar view showing two pairs of moving prisms as the deflecting media.

Fig. 5 is a diagram showing the paths of travel of the prisms shown in Fig. 4 to obtain recurring motion with a component of uniform velocity along the light rays toward the film.

Fig. 6 is a face view, on a smaller scale, of a shutter which may be employed in connection with the invention.

Fig. 7 is a plan view, partly in section, of a form of projecting apparatus by means of which the invention may be carried out.

Fig. 8 is a side elevation, partly in section and partly in diagram, of the same.

In order to satisfactorily project a transversely moving light beam such as, for instance, in projecting moving pictures, or to satisfactorily project a stationary light beam on a moving object or screen, such as in photographing moving pictures or in television apparatus, it is evident that constant optical relation between the light source and the object or screen upon which it is projected must be maintained. In all prior devices employing continuously moving films or screens with prisms between them and the lens, certain optical errors are present. The principal errors are:—

(1) Lack of uniformity in the length of the parallel rays.

(2) Dispersion, due to the different refrangibility of the component colors of light, and (3) Aberration, due to the fact that rays of different divergency do not refract uniformly.

These errors are avoided or minimized by the present invention because of the distinct geometric arrangement thereof, employing three major angles of deflection and means for moving one or more of the deflecting means.

In Fig. 1 is shown a diagram showing the travel of a ray of light passing through an object moving downward from A to A', and through the point C, C'. Ordinarily the ray from the point A to the point C, and that from the point A' to the point C', the limit of travel of the body, will travel further than the ray from any point between A and A'.

By deflecting the ray downward from the points A and any point between A and A' and then upward to the point C, C' while moving the deflecting means from B downward and toward the body to B', the length of the ray from the line A—A' to the point C will be the same at any point from A to A'.

The same result may be secured by making the deflecting means stationary at B—B' and moving the deflecting means horizontally from A to A' and another deflecting means horizontally from C to C', as shown in Fig. 2.

The first principle of the invention may be expressed by the following equation, the line A—A' representing the movement of a film across the luminous field of a projecting apparatus:—

$$AB + BC = A'B + B'C' = \text{constant}$$

That is, the paths of any ray such as A B C, and all parallel rays, are of equal and constant length for any position of the film within the luminous field.

The second principle of the invention may be expressed in the equation $$\frac{AB}{BC} = Y\frac{A'B'}{B'C'}$$

in which Y is a variable dependent upon the position of the film. In other words, the motion of the film is compensated for by definitely varying the ratio of the lengths of the deflected portions of the rays.

By having three major angles of deflection such as A, B, C, it is evident that for any shortening of the ray A—B there is an equal lengthening of the ray B—C; furthermore, the errors of dispersion and aberration in one direction are largely neutralized by reverse dispersion and aberration in the opposite direction. As long as a ray does not suffer any net deflection, or net displacement, dispersion and aberration do not occur regardless of the intermediate deviation. Therefore, when the center of a picture in the film coincides with the principal axis of the projecting lens, these optical errors are absent regardless of the three angles of deflection. When the film is in any other position slight errors occur but as these constantly vary from positive to negative their effect upon the screen is largely neutralized. These slight errors are, however, avoided by means hereinafter described.

The diagram of Fig. 3 shows the application of the invention to the optical media of a motion picture projecting apparatus, in which D designates a diverging lens placed between a source of light (not shown) and a film E, which is assumed to be moving downward, so as to render approximately parallel the greater part of the converging rays from the light-condensing system. The function of the lens D is to minimize aberration by reducing the angularity of the rays to thus produce greater uniformity of refraction.

Rotating on the side of the film opposite the lens D is a shutter F which permits of the transmission of light towards the objective only during the period at which the deflecting means have the correct position.

A fixed deflecting prism G is mounted on the the opposite side of the shutter from the lens to deflect the rays of light downward at an angle, and K designates a type of projecting lens mounted at a distance from the prism G. A fixed prism J is mounted in proximity to the lens K and between the same and the prism G. The lens D and lens K are preferably in axial alinement.

A prism H is movably mounted between the prisms G and J whereby the ray bent diagonally downward by the prism G will deflect diagonally upwardly to the prism J and thence horizontally by the latter through the lens K. The prism H moves away from the prism J in a diagonal line whereby any ray from the moving film deflected downward from the prism G will be deflected upwardly to the prism J and the length of the ray will be the same irrespective of the position of the movable prism.

As shown in Fig. 4 a double prism M is employed instead of the single prism H of Fig. 3. Each of the prismatic elements of the prism M has a refracting angle equal to the respectively adjacent prisms G and J whereby each light ray will be caused to pass through a uniform amount of glass.

M' is a device similar to M and is adapted to be moved longitudinally of the light ray in the same manner as the device M. In addition to above mentioned movement, the devices M and M' also have movements whereby one of them is brought into the luminous field while the other is leaving the said field and being returned to the initial position of a new cycle.

In Fig. 5 is shown the paths in which the elements may be moved each in its cycle into and out of the luminous field. The lines P and P' represent the paths of the elements M and M' respectively across the line of their travel toward the film at substantially constant velocity and the transverse motion may be harmonic or any other type of recurring motion, with the refracting faces always traveling in parallel planes.

At the points L and L' the prisms begin their true uniform motion and the light is then admitted through the shutter F. At the points S and S' the true uniform motion is completed and the shutter cuts off the light from that particular picture. The purpose of this particular movement is to provide a reciprocating motion of uniform velocity in one direction and a return motion outside the luminous field, without abrupt changes in acceleration at any time. Such a motion may describe a variety of curves, of which the lines P and P' are given as examples.

In Fig. 4 N and N' represent ray filters, or transparent media of complementary colors. Instead of using definite and distinct objects as shown, the same effect may be secured by colors of, or colored surfaces on, the prisms.

Fig. 6 shows a face view of a form of shutter which may be employed. The shutter is provided with a plurality of spiral openings U, V and W which admit light to the prisms only when the prisms have true uniform motion. These openings may be covered by light transmitting media of complementary colors and thus pictures in natural colors may be projected from films having the correct color values, that is, from films which were originally exposed through a similar color shutter. If the number of openings in the shutter is a common multiple of the number of pairs of moving prisms, the colors in the openings may be substituted for the ray filters N and N'.

In projecting a black and white picture the shutter may be dispensed with if the points L, L', S and S' fall outside the luminous field.

In Figs. 7 and 8 are illustrated a simple form of projecting apparatus embodying the invention. The strictly optical devices of the apparatus are only partly shown in Fig. 7, and in Fig. 8 are illustrated in diagram. In both of the figures the double prism arrangement of Fig. 4 is shown, and the shutter is omitted.

In the drawings 1 designates a drive shaft on which is mounted a sprocket 2 for propelling the film E. The drive shaft carries a bevel gear 3 with which meshes a pinion 4 on a shaft which also carries a spiral gear 5 which, in turn, is in mesh with a spiral gear 6.

On the shaft of the gear 6 is a spur pinion 7 which drives two oppositely disposed gears 8, 8 and each gear 8 is respectively in mesh with a gear $8^a$ of similar size.

All of the above mentioned elements, except the film and its driving mechanism and the gearing 3 and 4, and the lenses and prisms are enclosed in a casing $a$. The shafts 9 of the gears 8, and $9^a$ of the gears $8^a$ each carries a counterbalance 10 or $10^a$, as the case may be, within the casing and the tops of the shafts project through the top of the casing as shown.

Rigidly secured to the top of each shaft 9 and above the casing is a cam 11, and a similar cam $11^a$ is similarly carried by each shaft $9^a$.

The cams 11, 11 form a conjugate pair and mounted on eccentrically carried studs $9^b$ $9^b$ on the cams is a connecting rod or slide 12 provided with a slot $9^c$ near each end thereof, through which a stud $9^b$ projects whereby the connecting rod may slide relatively to the cams. Mounted on a stud in the center of the rod 12 is a roller 13 adapted to be engaged between the cams whereby the rod may be given the more or less gyratory movement illustrated by the dotted P', Fig. 7. The double prism device M' is positioned on a block 14 carried by the stud over the center of the slide rod, and partakes of its motion.

A similar slide $12^a$ having slots $12^b$ is carried by the cams $11^a$, $11^a$, and its roller $13^a$ is likewise engaged by the cams to cause the prism element M to partake of the gyratory movement shown by the dotted line P, Fig. 7, the element M being supported on a block $14^a$ mounted on the slide $12^a$ in the same manner as the block of the slide 12 is mounted.

When the apparatus is operated, the motion is imparted to the elements M and M' comprises two components:—

(1) A circular motion due to the eccentricity of the mounting of the connecting rods $12^a$ and 12 relatively to the shafts 9, 9 and $9^a$, $9^a$.

(2) The motions toward and away from the film in the direction substantially axially with the passage of the light ray, due to the action of the rollers between the conjugate cams 11, 11 and $11^a$, $11^a$. This resultant motion may be resolved into a simple harmonic component traversing the luminous field, and a component of uniform velocity toward the film and any motion of easy translation away from the film.

The prism elements M and M' receive alternate pictures from the film, dissolve each picture into the next succeeding one, while projecting a picture upon the screen practically all of the time, thus avoiding the flicker common with projecting machines having intermittent feed of the film.

The pictures will remain on the screen for a longer period than those projected by the intermittent machine, and for this reason the speed of the film movement may be reduced, and the blending of colors in separate pictures may be better accomplished.

The general arrangement of the prisms satisfies the first requisite of constancy in the length of all parallel rays.

The motion imparted to the movable prisms meets the second requisite, that the ratio of the deflected portions of the rays be varied to synchronize with the moving film so as to retain constant optical relations between the film and the objective.

The distinctive feature of the complete geometric arrangement is that the plane of the projecting lens is parallel to the plane of the film, while no ray suffers any net deflection, although the rays suffer sufficient net displacement to make the central ray of each picture pass through the optical center of the projecting lens during the period of luminosity.

The apparatus above described, with slight modifications, may be employed in connection with two single prisms H, as illustrated in Fig. 3, or with the arrangement illustrated in the diagram of Fig. 3 in which a single stationary prism H is employed and the prisms G and J are movable in the manner described in connection with Fig. 2.

It is evident that the principle of the invention may be reversed from that above described, and be used as a camera for exposing a constantly moving negative film.

When the invention is used in any optical apparatus or system in a manner converse to that just described, it possesses several great advantages. By avoiding the inerta limitations of intermittent motion, or of harsh reciprocation, it makes greater speed practicable as for instance in the ultra-fast camera for taking the so-called "slow motion" pictures, television apparatus and the like. By affording a longer period of exposure for each picture, it avoids photographic difficulties due to poor lighting or the use of ray filters of colors with low actinic power.

Although the invention has been described as employing refracting prisms for bending the light rays, it is to be understood that light reflecting media may be employed to accomplish the same purpose.

It will also be understood that the light deflecting elements may be operated by means other than those illustrated, and that the invention is not limited to the particular apparatus illustrated and described.

Instead of the simple prisms illustrated, each of the prisms may be made up of achromatic combinations whereby deviation, without dispersion, may be secured. By this method the ray filters, which are primarily intended to permit light of approximately only one degree of refrangibility to pass through a particular series of non-achromatic prisms which are correspondingly adjusted, may be eliminated.

In accordance with the provisions of the patent statutes the principle of the invention has been described, together with the apparatus which is now considered to represent the best embodiment thereof, but it is desired to have it understood that the apparatus shown is merely illustrative, and that the invention may be carried out in other ways.

The invention having been described, what is claimed as new and desired to be secured by Letters Patent, is as follows:—

1. An optical device adapted to transform the movement of a beam of light, including means for deflecting said beam in a plane at a predetermined angle away from its original path; a second means for deflecting said beam of light back toward its original path; a third means for deflecting said beam in a plane parallel with its original path, said second deflecting means being movable along the path of the beam emergent therefrom, and operable mechanism for actuating said second deflecting means to vary the ratio between the lengths of the two deflected portions of the light beam at predetermined speeds while maintaining the constant length of the total light beam.

2. An optical device for deflecting a light beam from the plane of its source and emitting it at a point in a plane parallel to the plane of its source, one of said planes having motion relative to the other, including means for deflecting said beam in a plane at a predetermined angle away from its original path, and second means for deflecting said beam in a plane back toward its original path; and third means for deflecting said beam in a plane parallel with its original path; and means for moving the second deflecting means along the path of the beam emergent therefrom to vary the ratio between the lengths of the second deflected portions of the light beam at a predetermined speed while maintaining the constant length of the total beam.

3. An optical device adapted to transform the movement of a beam of light, including prism means refracting said beam in a plane at a predetermined angle away from its original path, a second prism means refracting said beam in a plane back toward its original path; a third prism means refracting said beam in a plane at another angle to a path parallel with its original path, and means for moving the second prism means along the axis of the beam emergent therefrom to vary the ratio between the lengths of the two deflected portions of the light beam at a predetermined speed while maintaining the constant length of the total beam.

4. An optical device adapted to transform a beam of light from the plane of its source and emitting it at a point in a plane or planes parallel to the plane of its source, including prism means refracting said beam in a plane at a predetermined angle away from its original path, a second prism means refracting said beam in a plane back toward its original path; a third adjustable prism means refracting said beam in a plane parallel with its original path, said second prism means being movable along the path of the beam emergent therefrom, and operable mechanism for actuating said second prism means to vary the ratio between the lengths of the two deflected portions of the light beam at a predetermined speed while maintaining the constant length of the total beam.

5. An optical device adapted to transform a beam of light, whose axis is moving in a plane transversely at a uniform speed, into a beam of light whose axis is stationary, said device including prism means refracting said beam in a plane at a predetermined angle away from its original path, a second prism means refracting said beam in a plane at a greater angle than said first angle, back toward its original path; a third prism means refracting said beam in a plane at another angle to a path parallel with its original path, and means for moving the second prism means along the axis of the beam emergent therefrom at such a speed as to maintain the axis of said emergent beam stationary, the disposition of all prisms being such as to maintain the constant total length of the beam.

6. An optical device adapted to transform a beam of light, whose axis is moving in a plane transversely at a uniform speed into a beam of light whose axis is stationary, said device comprising prism means refracting said beam in a plane at a predetermined angle away from its original path, a second prism means refracting said beam in a plane at twice said angle, back toward its original path, a third prism means refracting said beam in a plane at the first mentioned angle to a path parallel with its original path, means for moving the second prism means along the axis of the beam emergent therefrom at such a speed to maintain the axis of said emergent beam stationary, the disposition of all prisms being such as to maintain the constant total length of the beam.

7. An optical device, including means for continuously moving a film, an objective lens, an optical system disposed between the film and the objective lens, said optical system comprising medii for imposing three major angles of deflection to any light rays which pass therethrough, said deflecting medii including a medium for first deflecting the rays away from the axis of its original path, a medium for deflecting said rays back toward said path, and another medium for deflecting the rays concentric with the axis of the objective lens, and further means within the optical system for operating at least one medium to definitely vary the ratio between the lengths of the various deflected portions of the rays in synchronism with the continuous motion of the film so as to render the rays stationary through the objective lens and of constant total length between the film and the lens.

8. An optical device including means for continuously moving a film, a lens, an optical system disposed between the film and lens, said optical system comprising deflecting medii disposed relative to each other in a light path for imposing three major angles of deflection to the light rays passing therethrough to provide a V-shaped detour in all rays between the film and lens, and means for actuating certain of the medii to vary the lengths of the deflected rays in synchronism with the movement of the film so that there will be no relative motion between the film and the light rays which pass through the lens while the path of the rays between the film and lens is maintained at constant length.

9. An optical device including means for moving a film, a lens spaced apart from the film, a pair of stationary prisms positioned between the film and lens in axial alinement therewith, said prisms being spaced apart, a plurality of light deflecting devices positioned between the prisms to receive the light beam emergent from one of the prisms and deflecting the beam back to the other of said prisms, and means for moving the devices in the light beam between said prisms and in timed relation to the movement of the film for maintaining constant optical relation between the film and the lens in the path through the prisms.

10. An optical device including means for moving a film, a lens spaced apart from the film, a pair of normally stationary prisms positioned between the film and lens in axial alinement therewith, said prisms being spaced apart, a plurality of light deflecting devices positioned between the prisms to receive the light beam emergent from one of the prisms and deflecting the beam back to the other of said prisms, and means for moving the devices recurrently in timed relation to the movement of the film and toward the film to maintain constant optical relation between the film and the lens in the path through the prisms.

11. An optical device including means for moving a film, a lens spaced apart from the film, a pair of prisms disposed between the film and the lens, said prisms being spaced apart, a pair of deflecting devices disposed between the prisms to receive the light beam from one of said prisms and for diverting it back to the other of said prisms, each device including at least one prism, and means for imparting a recurring movement to the devices whereby the devices will be moved toward and away from the film and transversely back and forth, said movement toward the film being such as to maintain constant optical relation between the film and the lens during the respective periods in which the deflecting devices traverse the optical path between the pair of prisms.

12. An optical device adapted to transform the motion of a beam of light, including a light deflecting element, a carriage supporting the element, a pair of conjugate cams mounted on parallel rotating shafts, a link member supporting the carriage, said link member being mounted eccentrically on said shafts and extending from one to the other so as to impart a gyratory movement to the carriage, said cams engaging said carriage during their rotation whereby said gyratory movement is modified by the action of the conjugate cams so that the deflecting element travels in such velocity as to transform as desired the motion of the beam of light incident thereon.

13. An optical device adapted to transform the motion of a beam of light, including a plurality of light deflecting elements, carriages supporting the elements, two pair of rotating conjugate cams, link members one connecting the cams of each pair and providing sliding supports for each carriage, said link members being eccentrically mounted with respect to the axis of the respective pair of cams so as to impart a gyratory movement to the carriages, each pair of cams engaging opposite sides of its respective carriage whereby said gyratory movement is modified by the action of the cams, the respective motions of the carriages being timed so that the deflecting elements alternately intercept and transform the beam of light.

14. In an optical system for transmitting light, the combination of means for continuously moving a film, a lens, an optical system disposed between the film and the lens and comprising a deflector disposed to intercept and deflect any light rays from the film, a movable deflector disposed in advance of said first deflector to intercept said rays and to direct them back toward the original path, means for moving said movable deflector recurrently across the light path and toward the film in synchronism therewith and returning away from the film out of said path, and a stationary deflector disposed in advance of said movable deflector to intercept said rays therefrom and to complete the deflection of the rays into alinement with their original path whereby the resultant effect of the entire optical system and the movement thereof compensates for the movement of the film and renders stationary the light rays therefrom.

15. In an optical device, means for continuously moving a film, an objective lens, an optical system disposed between the film and lens, which optical system comprises at least three refracting prisms arranged to impose a V-shaped detour in all rays between the film and lens, and operable means for changing the relative position of the prisms to definitely vary the ratio of the lengths of the detoured rays to compensate for the movement of the film.

16. An optical device including means for continuously moving a picture film, an objective lens, an optical system disposed between the film and lens, which optical system comprises normally stationary prisms spaced apart, a plurality of movable prisms between said spaced prisms to receive any light beam from one of said first mentioned prisms and deflecting said beam back to the other of said first mentioned prisms, a mechanism for actuating the movable prisms to alternately bring them into alinement with the film and in timed relation to the individual pictures of the film, said mechanism including means for imparting to said movable prisms, while in alinement with the film, a linear motion at substantially right angles to the film whereby the rays through the lens will remain stationary regardless of the motion of the film.

17. An optical device including means for continuously moving a film, a lens, an optical system disposed between the film and lens, which optical system comprises two stationary prisms spaced apart, a plurality of movable prisms between said stationary prisms, a mechanism for actuating the movable prisms alternately into alinement with the lens in timed relation to the film, said mechanism also imparting to said movable prisms a linear motion similar to that of the film and at substantially right angles thereto, when in alinement with said lens.

18. In an optical system for transforming the movement of a beam of light, medii for imposing three major angles of deflection to any light passing therethrough thus creating at least two obliquely deflected portions of the beam, said deflecting medii including a medium for first deflecting the rays away from the axis of its original path, a medium for deflecting said rays back toward said path, and another medium for deflecting the rays in a plane coincidental with or parallel with its original path, and operable means for operating at least one medium to vary the ratio of the lengths of the obliquely deflected portions of the beam so as to transform the net transverse movement of the beam while maintaining the constant length of the total beam.

This specification signed and witnessed this Fourth day of September, 1924.

BENSON F. WADDELL.